UNITED STATES PATENT OFFICE.

ARTHUR H. BAILEY, OF WATERTOWN, MASSACHUSETTS.

PROCESS OF MAKING CLAM-EXTRACTS.

SPECIFICATION forming part of Letters Patent No. 394,808, dated December 18, 1888.

Application filed September 17, 1888. Serial No. 285,603. (No specimens.)

*To all whom it may concern:*

Be it known that I, ARTHUR H. BAILEY, of Watertown, in the county of Middlesex and State of Massachusetts, have invented certain new and useful Improvements in Processes for Making Clam Juice or Extract, of which the following is a specification.

This invention has for its object to separate the liquid nutriment from clams in a satisfactory and economical manner, and to produce a liquid clam-extract which shall be nutritious, palatable, and in compact form.

To this or these ends the invention consists in the improved process which I will now proceed to describe and claim.

In carrying out my invention I place the uncooked clams in a retort or receptacle, which is preferably air and steam tight, and admit live steam into said retort for twenty minutes, or more or less, as may be desired. The steam causes the shell or clam to open, thus liberating the liquid or juice from the solid meat of the clams, and said liquid drops into suitable pans placed for the purpose under the clams, the latter being supported by suitable open racks or gratings. The juice or liquid extract thus obtained is next passed through a suitable filter, and is then boiled to evaporate a part of the water and concentrate the extract, thus making a given quantity of it richer than it would otherwise be. The boiling also cooks the nutritive elements in the liquid sufficiently to prevent ready decomposition when exposed to the air. The liquid is finally put, while hot or cold, into cans or jars and hermetically sealed, the time of processing or cooking the jars or cans, so as to exclude the air and have it keep in any climate, varying as to whether the concentrated juice or extract is filled into the cans or jars hot or cold.

The extract thus made is rich in nutriment, and is at the same time easily assimilated, so that it is a valuable tonic for people with weak or impaired digestive organs and as an article of food either alone or combined with water, milk, or liquors. It is excellent as a tonic for nursing mothers, and as a remedy for kidney difficulties, dyspepsia, indigestion, constipation, gastric or malarial troubles, patients recovering from fevers, or those reduced by excessive dissipation or overwork. No added salt is required, the saline properties of the clam being fully retained and sufficient to flavor the extract.

I claim—

The improved process of making clam juice or extract herein described, the same consisting in subjecting uncooked clams to live steam in closed air-tight or steam-tight retorts or tanks, thereby liberating and thoroughly cooking the juice therein, filtering the collected juice or liquid, and finally boiling and condensing the same, as set forth.

In testimony whereof I have signed my name to this specification, in the presence of two subscribing witnesses, this 13th day of September, A. D. 1888.

ARTHUR H. BAILEY.

Witnesses:
C. F. BROWN,
A. D. HARRISON.